US009052987B2

(12) United States Patent
Schneider et al.

(10) Patent No.: US 9,052,987 B2
(45) Date of Patent: Jun. 9, 2015

(54) VEHICLE INFORMATION SYSTEM FOR MOTOR VEHICLES WITH AT LEAST TWO ENGINES, MOTOR VEHICLE AND METHOD

(71) Applicant: GM GLOBAL TECHNOLOGY OPERATIONS LLC, Detroit, MI (US)

(72) Inventors: Tobias Schneider, Huenfelden-Mensfelden (DE); Roland Bauer, Ruesselsheim (DE); Alexander Weber, Gross-Gerau (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 264 days.

(21) Appl. No.: 13/621,672

(22) Filed: Sep. 17, 2012

(65) Prior Publication Data

US 2013/0080021 A1 Mar. 28, 2013

(30) Foreign Application Priority Data

Sep. 21, 2011 (DE) ........................ 10 2011 113 928

(51) Int. Cl.

| | |
|---|---|
| ***F02D 25/00*** | (2006.01) |
| ***G06F 19/00*** | (2011.01) |
| ***G07C 5/02*** | (2006.01) |
| *F02D 25/02* | (2006.01) |
| *G07C 5/08* | (2006.01) |

(52) U.S. Cl.

CPC ................ *G06F 19/00* (2013.01); *F02D 25/00* (2013.01); *G07C 5/08* (2013.01); *G07C 5/02* (2013.01)

(58) Field of Classification Search

CPC ......... F02D 25/00; F02D 25/02; F02D 25/04; F02D 28/00

USPC ................ 701/99, 101, 102, 110; 123/27 GE, 123/DIG. 8

See application file for complete search history.

(56) References Cited

U.S. PATENT DOCUMENTS

| | | | | |
|---|---|---|---|---|
| 5,291,410 A * | 3/1994 | Metz | ............................ | 701/110 |
| 5,447,132 A * | 9/1995 | Shoda et al. | .................. | 123/357 |
| 5,771,860 A * | 6/1998 | Bernardi | ....................... | 123/352 |
| 6,073,592 A * | 6/2000 | Brown et al. | ............. | 123/27 GE |

(Continued)

FOREIGN PATENT DOCUMENTS

| | | | |
|---|---|---|---|
| DE | 102009006466 A1 | | 9/2009 |
| KR | 2003037301 A | * | 5/2003 |
| WO | 0043738 A1 | | 7/2000 |

OTHER PUBLICATIONS

Autogas. Retrieved on Sep. 4, 2012. Retrieved from Internet: <URL: http://www.autogas-lpg-portal.de/modules.php?op=modload&name=XForum&file=viewthread&tid=14900>.

(Continued)

*Primary Examiner* — Mahmoud Gimie

(74) *Attorney, Agent, or Firm* — Ingrassia Fisher & Lorenz PC

(57) ABSTRACT

A vehicle information system for a motor vehicle is equipped with at least two engines, with at least two vehicle controllers each allocated to an engine. Each vehicle controller exhibits at least two distance measuring devices, which are designed to acquire the distances covered by the motor vehicle with the respective engine, a current consumption acquisition device, which is designed to acquire the current consumption of the respective engine, and an output device, which is designed to output the acquired distances and acquired current consumption.

17 Claims, 2 Drawing Sheets

(56) References Cited

U.S. PATENT DOCUMENTS

| | | | | |
|---|---|---|---|---|
| 6,201,312 | B1 | 3/2001 | Shioiri et al. | |
| 6,742,742 | B2 * | 6/2004 | Claudet | 244/17.13 |
| 7,114,379 | B2 * | 10/2006 | Emord | 73/114.52 |
| 7,416,510 | B2 * | 8/2008 | Gebby | 477/2 |
| 2011/0144839 | A1 | 6/2011 | Pudar | |
| 2011/0241859 | A1 | 10/2011 | Handa | |
| 2012/0179313 | A1 | 7/2012 | Hartl et al. | |

OTHER PUBLICATIONS

LPG Forum. Retrieved on Sep. 4, 2012. Retrieved from Internet: <URL: http://www.lpgforum.de/gas-cafe/4774-doppelter-kilometerzaehler.html>.

United Kingdom, Great Britain Search Report for Application No. GB1215149.4, dated Jul. 4, 2013.

* cited by examiner

VEHICLE INFORMATION SYSTEM FOR MOTOR VEHICLES WITH AT LEAST TWO ENGINES, MOTOR VEHICLE AND METHOD

CROSS-REFERENCE TO RELATED APPLICATION

This application claims priority to German Patent Application No. 10 2011 113 928.5, filed Sep. 21, 2011, which is incorporated herein by reference in its entirety.

TECHNICAL FIELD

The technical field relates to a vehicle information system for motor vehicles with at least two engines. The technical field further relates to a vehicle and a method for providing information.

BACKGROUND

In the development of modern motor vehicles, at least one objective of the vehicle engineer is to increase the efficiency, and hence lower the fuel consumption, of an automobile. One way of optimizing the fuel consumption of a motor vehicle involves combining various engine types into a vehicle. Reference is here also made to a so-called hybrid vehicle. In this case, for example, a conventional gasoline or diesel engine can be combined with a natural gas engine. However, gasoline or diesel engines can also be combined with a fuel cell or battery-based electric engine, for example.

During or after a drip, the driver of a motor vehicle generally also has to find out the respectively traveled kilometers and, for example, the fuel consumption of the motor vehicle. This is why modern motor vehicles most often exhibit an onboard computer, which can display this information to the driver. If a motor vehicle has two engines, the driver can at present only be shown how many kilometers he or she has traveled with the vehicle or how high the fuel consumption of the vehicle was as a whole, regardless of which portion of the distance was covered with which engine of the motor vehicle. It is currently impossible to separately display the distance traveled with a respective engine or the consumption of an individual engine.

In view of the foregoing, at least one object is to provide a way of better informing the driver of a motor vehicle. In addition, other objects, desirable features and characteristics will become apparent from the subsequent summary and detailed description, and the appended claims, taken in conjunction with the accompanying drawings and this background.

SUMMARY

A vehicle information system is provided for a motor vehicle equipped with at least two engines, with at least two vehicle controllers each allocated to an engine. Each vehicle controller exhibits at least two distance measuring devices, which are designed to acquire the distances covered by the motor vehicle with the respective engine, a current consumption acquisition device, which is designed to acquire the current consumption of the respective engine, and an output device, which is designed to output the acquired distances and acquired current consumption. A motor vehicle with at least two engines and a vehicle information system according to the invention.

A method is provided for providing information with a vehicle information system according to the invention, involving the steps of acquiring a distance covered by the motor vehicle with at least two vehicle controllers. Each vehicle controller acquires the distance covered with an engine allocated to the respective vehicle controller, acquiring the current consumption of the engine allocated to the respective vehicle controller by means of the vehicle controllers, and outputting the acquired distances and acquired current consumption by means of an output device.

Stock is taken and, in a motor vehicle with at least two engines, providing separate data acquisition for each of the engines by way of a separate vehicle controller. In particular, the respective controller for each engine separately acquires data about the distance covered with the respective engine. As a consequence, for example, the driver receives the number of kilometers he or she has traveled with the respective engine, e.g., between two refueling stops. By diversifying the information about consumption and distance traveled to the respective engine, the device significantly enhances the level of comfort and information.

In an embodiment, at least one of the distance measuring devices exhibits a respective reset device, with which a counter reading of the distance measuring devices can be reset. This makes it possible to acquire individual distances, and initiate a new distance measurement at any time by simply resetting a distance measuring device.

In another embodiment, at least one vehicle controller exhibits another distance measuring device. The additional distance measuring device is designed to acquire the distance covered by the motor vehicle with the respective engine, and automatically reset itself after the motor vehicle has stood idle for a prescribed period of time. This makes it possible to acquire the distance covered during a trip even if the driver forgets to reset one or both of the additional distance measuring devices at the beginning of a trip, for example.

In an embodiment, a vehicle controller exhibits a calculator, which is designed to calculate an average consumption of the engine allocated to the respective vehicle controller from the data acquired about the current consumption of the engine allocated to the respective vehicle controller. The vehicle controllers can here continuously calculate the average for the individual current consumption values, for example, by adding or integrating the values for the current consumption of the respective engine, and dividing by the number of acquired values. In another embodiment, the vehicle controller can perform a continuous averaging calculation with only a few current consumption values, e.g., with only every second, tenth, hundredth, etc., value.

In another embodiment, the vehicle controller does not calculate the average consumption from the sum of individual current consumption values. In such an embodiment, the vehicle controller calculates the average consumption by storing the number of acquired current consumption values and current average consumption value. If a new average consumption is to be calculated, the vehicle controller multiplies the current average consumption value by the number of previously acquired current consumption values, adds the new current consumption value to the result of this multiplication, and divides the result of this addition by the number of previously acquired current consumption values plus one. This enables a very memory-efficient calculation of average consumption, since only the number of acquired current consumption values and the latest average consumption value must be stored, instead of all current consumption values.

In an embodiment, at least one vehicle controller exhibits a communications interface. The vehicle controller is designed to exchange data about the distance covered with the respective engine with at least one other vehicle controller via this communications interface, and calculate the total distance covered by the motor vehicle by means of the calculator. This can be done separately for one of the respective distance measuring devices. As a result, the distance covered jointly with the two engines of the motor vehicle can be displayed.

In one embodiment, the vehicle controller is further designed to exchange data about the current consumption or average consumption of the respective engine with other vehicle controllers, and display the combined average consumption by all engines of the motor vehicle.

In an embodiment, at least one vehicle controller is designed to record data about the current state of the motor vehicle provided by vehicle systems on a data bus via the communications interface. The distance measuring devices and/or current consumption acquisition device are further designed to acquire the distance or current consumption based on the data about the current state of the motor vehicle. Data about the current state of the motor vehicle can here include the motor vehicle engine speed, a fuel injection quantity, a vehicle speed or the like. These data are typically determined by an (engine) controller, and can be transmitted to additional participants via an internal data bus.

In another embodiment, at least one vehicle controller is designed to directly obtain the value for the current consumption of the respective engine from a respective engine controller via the communications interface.

In an embodiment, the communications interface is designed as a CAN interface and/or a FlexRay interface and/or an optical fiber interface and/or a radio interface. This makes it possible to flexibly adjust the individual vehicle controllers to the most varied of requirements and applications.

An embodiment provides a user interface that exhibits at least one input interface designed to query the user of the respectively used motor vehicle for the current price of the fuel for the respective engine. To this end, the vehicle controller is designed to calculate a price difference for the fuel consumed over a distance covered with at least two engines in relation to a distance covered with just a single engine, and display the calculated price difference to the user with an output device of the user interface. In this way, the driver of the motor vehicle can directly determine what savings can be realized for his or her motor vehicle by the at least one alternative engine. This also makes it possible to optimize costs when using the two engines. As a result, the overall acceptance of such motor vehicles equipped with at least two engines is increased.

In an embodiment, the vehicle controller is designed as a program-controlled device, in particular as a microcontroller and/or programmable logic chip and/or computer program module. This makes it possible to flexibly adjust the controller to different requirements and fields of application.

Where expedient, the above embodiments and further developments can be combined with each other as desired. Other possible embodiments, further developments and implementations of the invention also encompass combinations not explicitly mentioned of features in the invention described above or below in relation to the exemplary embodiments. In particular, one of ordinary skill in the art will also add individual aspects as improvements or enhancements.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
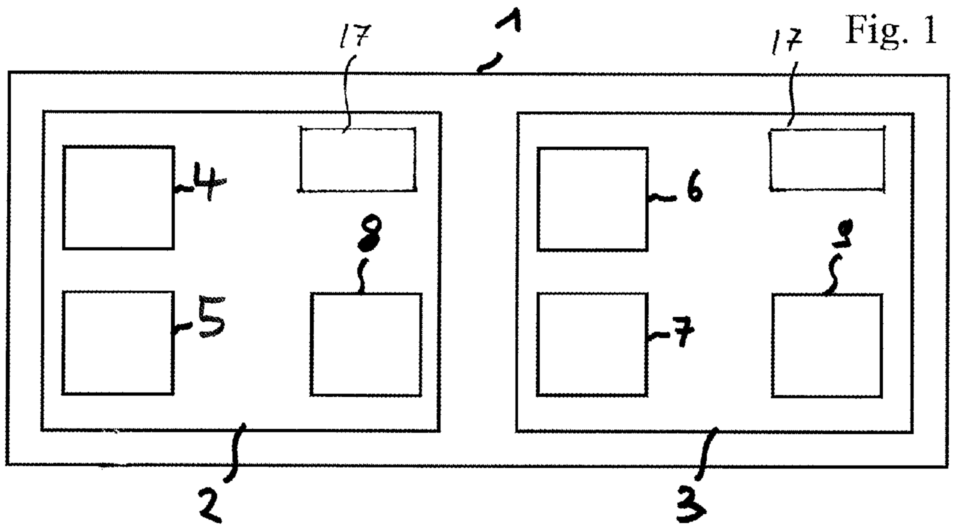
FIG. 1 is a block wiring diagram of an embodiment of a vehicle information system according to an embodiment.

FIG. 1 shows a block wiring diagram of an embodiment of a vehicle information system 1. The vehicle information system 1 exhibits two vehicle controllers 2, 3, which each have two distance measuring devices 4, 5 or 6, 7. Further, each vehicle controller 2, 3 exhibits a current consumption acquisition device 8, 9 and a display device 17. For example, the vehicle information system 1 is a component of a control device, e.g., a control device for the driver information.

The distance measuring devices 4, 5 and 6, 7 are here designed as microcontrollers 4, 5 and 6, 7, and are intended to acquire the covered distance by integrating the vehicle speed over the traveling time. The respective distance measuring devices 4, 5 or 6, 7 can here acquire the vehicle speed via speed sensors and by means of a data bus directly from the vehicle control device, e.g., the engine control device, or the like. The current consumption acquisition devices 8, 9 are also designed as microcontrollers 8, 9, and are intended to acquire the current consumption value by recording the current consumption value, e.g., for an engine control device. In additional embodiments, the distance measuring devices 4, 5 and 6, 7 and the current consumption acquisition devices 8, 9 can be designed as computer program products, which are implemented in a microcontroller or in other vehicle systems.

Figure 2:
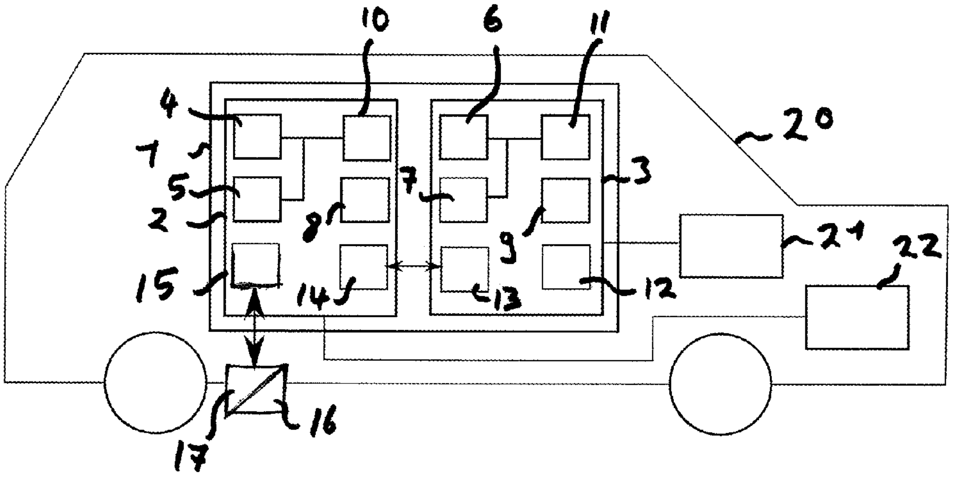
FIG. 2 is a block diagram of an embodiment of a vehicle according to an embodiment.

FIG. 2 shows a block diagram of a motor vehicle here depicted only schematically. The motor vehicle marked with reference number 10 exhibits two engines 21, 22, which each are coupled with one of the vehicle controllers 2, 3. For example, let the first engine 21 be a gasoline or diesel engine, and the second engine 22 be an electric or natural gas engine. The vehicle controllers 2, 3 on FIG. 2 differ from the vehicle controllers 2, 3 on FIG. 1 in that each vehicle controller 2, 3 here exhibits a reset device 10, 11, which is coupled with the respective distance measuring devices 4, 5 and 6, 7 so as to reset the latter. The second vehicle controller 3 further exhibits another distance measuring device 12, which is designed to acquire the distance covered by the motor vehicle 20 with the first engine 21, and automatically reset itself after the motor vehicle 20 has stood idle for a prescribed period of time. The vehicle controllers 2, 3 further each exhibit a communications interface 13, 14, which are coupled with each other. Finally, the vehicle controller 2 exhibits a user interface 15, which has an input interface 16 and an output device 17.

In additional embodiments not depicted here, both vehicle controllers 2, 3 each exhibit another distance measuring device 12, which acquires the distance covered by the motor vehicle 20 with the respective engine 21, 22, and automatically resets itself again after the motor vehicle 20 has stood idle for a prescribed period of time. Let the user interface 15 here be integrated into an HMI interface (human machine interface) of the vehicle 20. In other embodiments, the user interface 15 can also be designed as a separate user interface 15.

Figure 3:
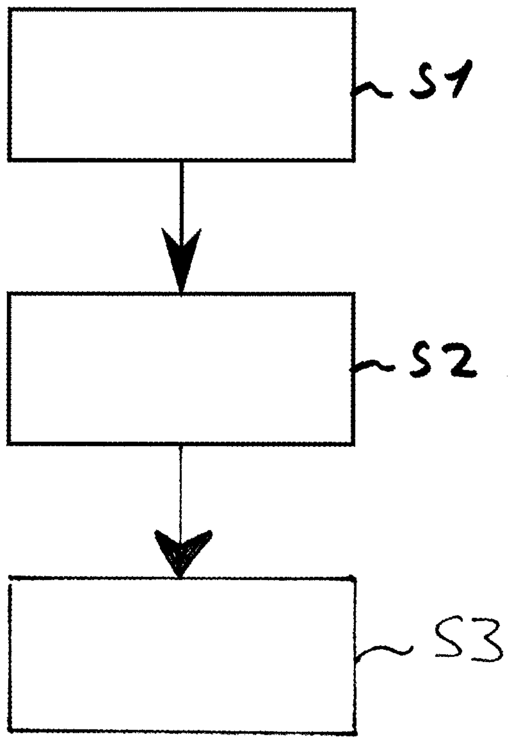
FIG. 3 is a sequence diagram of an embodiment of a method according to an embodiment.

FIG. 3 shows a sequence diagram for an embodiment of a method according to the invention. In a first step S1, a distance covered by the motor vehicle 20 is acquired with at least two motor vehicle controllers 2, 3. In this case, each vehicle controller 2, 3 separately acquire the distance covered with the engine 21, 22 allocated to the respective motor vehicle controller 2, 3.

In another step S2, the current consumption of the engine 21, 22 allocated to the respective motor vehicle controller 2, 3 is separately acquired by the respective motor vehicle controllers 2, 3. In a third step S3, the acquired distances and acquired current consumption values are output via an output device specifically provided for this purpose.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle information system for a motor vehicle equipped with a first engine and a second engine, comprising:
- a first controller allocated to the first engine; and
- a second controller allocated to the second engine;
- wherein the first controller and the second controller comprise:
  - at least two distance measuring devices that are configured to acquire distances covered by the motor vehicle;
  - a current consumption acquisition device that is configured to acquire a current engine consumption; and
  - an output device that is configured to output the distances and the current engine consumption;
  - wherein at least one of the at least two distance measuring devices comprises a respective reset device that is configured to reset a counter reading.

2. The vehicle information system according to claim 1,
- wherein at least one vehicle controller comprises a third distance measuring device, and
- wherein the third distance measuring device is configured to acquire the distances covered by the motor vehicle and automatically reset after the motor vehicle is idle for a prescribed period.

3. The vehicle information system according to claim 1, wherein a vehicle controller comprises a calculator that is configured to calculate an average consumption from data acquired for the current engine consumption.

4. The vehicle information system according to claim 3,
- wherein at least one vehicle controller comprises a communications interface,
- wherein the vehicle controller is configured to exchange the data about the distances with at least one other vehicle controller via the communications interface and calculate a total distance covered by the motor vehicle with the calculator.

5. The vehicle information system according to claim 4,
- wherein the at least one vehicle controller is configured to record data about a current state of the motor vehicle via the communications interface,
- wherein the current consumption acquisition device is further configured to acquire the current engine consumption based on the data about the current state of the motor vehicle.

6. The vehicle information system according to claim 4, wherein the communications interface is a CAN interface.

7. The vehicle information system according to claim 3, further comprising a user interface comprises at least one input interface that is configured to query a price of fuel,
- wherein the vehicle controller is configured to calculate a price difference for fuel consumed over a first distance covered with the first engine and the second engine in relation to a second distance covered with the first engine, and display the price difference with the output device of the user interface.

8. The vehicle information system according to claim 3, wherein the vehicle controller is a program-controlled device.

9. A motor vehicle, comprising:
- a first engine;
- a second engine; and
- a vehicle information system, comprising:
  - a first controller allocated to the first engine; and
  - a second controller allocated to the second engine;
  - wherein the first controller and the second controller comprise:
    - at least two distance measuring devices that are configured to acquire distances covered by the motor vehicle;
    - a consumption acquisition device that is configured to acquire a current engine consumption; and
    - an output device that is configured to output the distances and the current engine consumption;
    - wherein at least one of the at least two distance measuring devices comprises a respective reset device that is configured to reset a counter reading.

10. The motor vehicle according to claim 9,
- wherein at least one vehicle controller comprises a third distance measuring device, and
- wherein the third distance measuring device is configured to acquire the distances covered by the motor vehicle and automatically reset after the motor vehicle is idle for a prescribed period.

11. The motor vehicle according to claim 9, wherein a vehicle controller comprises a calculator that is configured to calculate an average consumption from the data acquired for the current engine consumption.

12. The motor vehicle according to claim 11,
- wherein at least one vehicle controller comprises a communications interface,
- wherein the vehicle controller is configured to exchange data about the distances with at least one other vehicle controller via the communications interface and calculate a total distance covered by the motor vehicle with the calculator.

13. The motor vehicle according to claim 12,
- wherein the at least one vehicle controller is configured to record data about a current state of the motor vehicle via the communications interface,
- wherein the consumption acquisition device is further configured to acquire the current engine consumption based on the data about the current state of the motor vehicle.

14. A method for calculating information, comprising:
- acquiring a covered distance covered by a motor vehicle with a first motor vehicle controller and a second motor vehicle controller, wherein the first motor vehicle controller and the second motor vehicle controller are separately configured to acquire the covered distance;

acquiring a current consumption with the first motor vehicle controller and the second motor vehicle controller;

outputting the covered distance and the current consumption via an output device;

allocating another distance covered by the motor vehicle; and automatically resetting the covered distance after the motor vehicle is idle for a prescribed period.

15. The method according to claim 14, further comprising calculating an average consumption from the current consumption.

16. The method according to claim 14, further comprising recording data about a current state of the motor vehicle provided by a vehicle system on a data bus via a communications interface, wherein the covered distance acquired based on the data about the current state of the motor vehicle.

17. The method according to claim 14, further comprising:

querying a price of fuel;

calculating a price difference for fuel consumed over a first distance covered with a first engine and a second engine in relation to a second distance covered with the first engine; and displaying the price difference via a user interface.

* * * * *